United States Patent Office 2,761,073
Patented Aug. 28, 1956

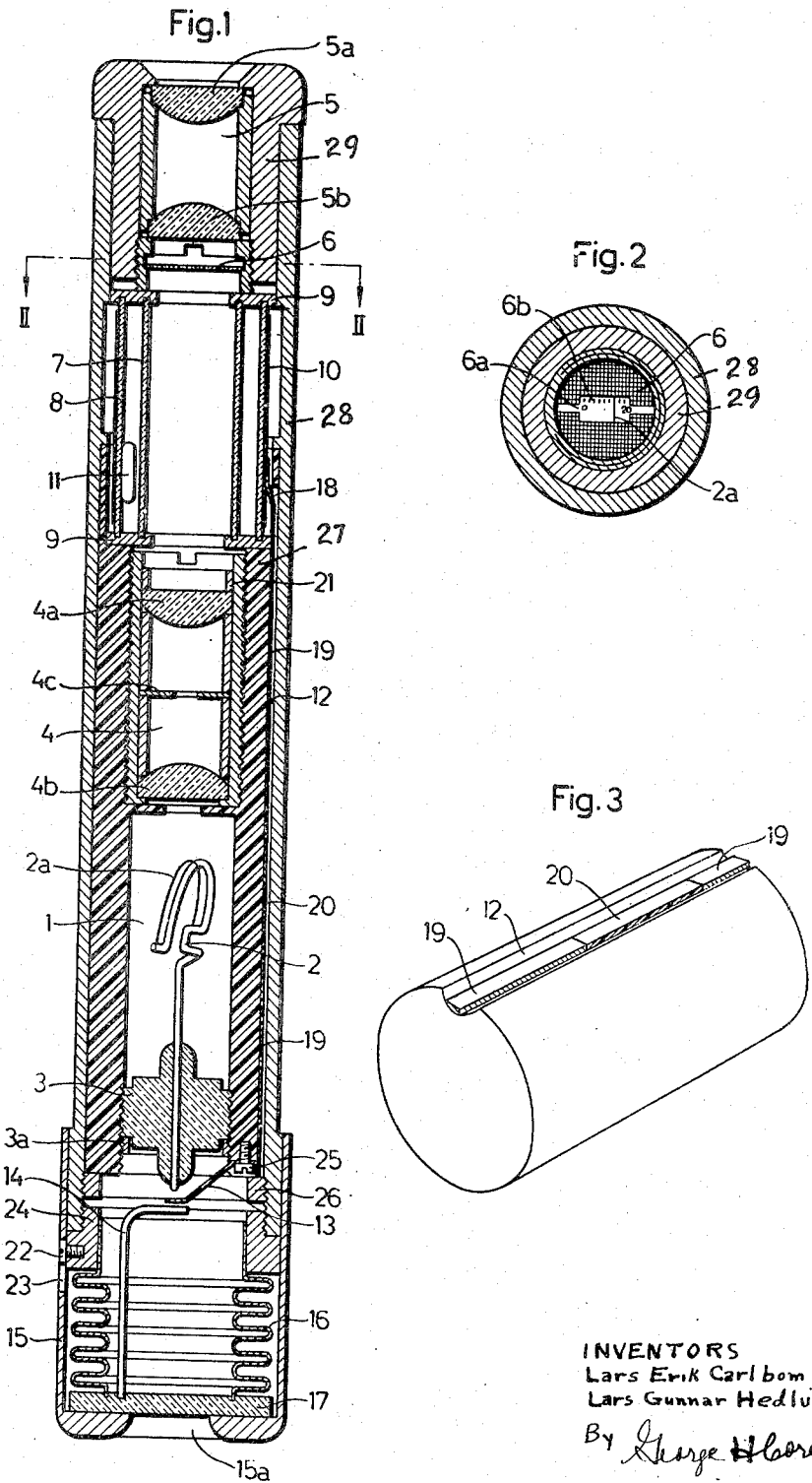

2,761,073

RADIATION DOSIMETER FOR INDICATING GAMMA AND X-RAY RADIATION

Lars Erik Carlbom and Lars Gunnar Hedlund, Stockholm, Sweden

Application June 19, 1953, Serial No. 362,772

Claims priority, application Sweden June 21, 1952

16 Claims. (Cl. 250—83.6)

This invention relates to a radiation dosimeter for indicating gamma and X-ray radiation, particularly a charging device of such a dosimeter.

The object of the invention is to provide a simple and effective instrument of this kind in which charging is effected by shaking the charging device for producing sufficient potential.

A further object of the invention is to enable the associated electrometric system to be charged slowly from said charging device so that the charging may be interrupted when a predetermined reading is obtained, and this slow charging may be effected by arranging the charge from the charging device to pass across a large electric resistance to the electrometric system.

A still further object of the invention is to make the instrument perfectly moisture-proof which is facilitated by providing a minimum of movable parts in the instrument.

With these and other objects in view the charging device according to the invention comprises at least one container or casing of electrically insulating material, for instance of glass tube, containing at least one movable body adapted to move alongside the wall of the container so as to generate frictional electricity in said wall, the exterior of said wall having applied thereon a metal foil which is adapted to be connected conductively with the electrometric system, while the container has a conductive internal wall for leading off the charge of the movable body.

The invention will now be described with reference to the accompanying drawing which illustrates one embodiment of an instrument according to the invention. In the drawing:

Fig. 1 is a longitudinal section of the instrument;

Fig. 2 is a cross-section on the line II—II of Fig. 1, and Fig. 3 is a diagrammatical view on an exaggerated scale of some details of the instrument.

In the drawing 1 denotes an ionisation chamber of a radiation dosimeter. The walls 27 of the casing of this chamber consist of so-called Plexiglas or other electrically insulating material coated on the inside with a layer of graphite. In the ionisation chamber there is provided an electrometric system comprising a support 2, for instance of aluminium, which carries a gold-coated quartz wire 2a having a thickness of for instance 5μ. The support 2 is carried in an insulating plug 3 of polystyrene or other transparent or translucent plastic material, for instance. The plug 3 is threaded in and is held in the casing by means of a threaded ring 3a screwed into one end of said casing 27. At the opposite end of the casing 27 there is provided the objective 4 of a microscope, said objective comprising two lenses 4a and 4b and an intermediate aperture plate 4c. A split resilient ring 21 is arranged to maintain the aggregate of lenses in their place in a surrounding sleeve screwed into the end of casing 27.

The casing 27 is inserted in an outer casing 28 of aluminium, for instance. The casing 28 encloses the charging device proper, here shown in the form of two glass tubes 7 and 8 attached in coaxial relation between iron plates 9 or the like having central apertures to permit light to pass therethrough.

The ocular 5 of the microscope comprises two lenses 5a and 5b and a scale disc 6 having an aperture or window 6a with a scale 6b applied thereon and graduated in units of Röntgen, for instance. The ocular 5 is fitted in a sleeve 29 attached to the end of casing 28. When viewing through the ocular the quartz wire 2a will be observed in the aperture 6a of the disc 6.

Into the other end of the casing 28 there is screwed a stop ring 26 holding the casing 27 in its place. In the same end is also a further threaded ring 24 serving as attachment for a stop screw 22 engaging a slot 23 of a cap 15 which is slidable on the end of casing 28. The ring 24 also serves as attachment for one end of an expandible air tight and resilient bellows 16 the other end of which is secured in a disc 17 of transparent material such as Plexiglas or the like material allowing the passage of light through the instrument from a central aperture 15a in the cap 15. The slot 23 is shaped like a one-turn cap slot so as to lock the cap 15 in its outer position.

Secured to the end of the casing by means of a screw 25 is a metallic contact spring 13 and secured to the disc 17 is a suitable arm 14 insulated electrically from the casing 28. Upon depressing the cap 15 by an external thrust or pressure on the head of the cap 15 as far as permitted by the slot 23, the arm 14 will be caused to contact the spring 13 which in turn contacts the protruding end of the wire 2 of the electrometric system. When the pressure on the head of the cap 15 ceases it will be returned by means of the resilient action of the bellows 16.

Housed in the space between the two glass tubes 7 and 8 is a drop of mercury 11. The outer tube 8 has a coating 10 of metal foil which contacts a metallic strip 18 by means of which said foil is in conductive connection with high resistance of suitable kind leading to contact spring 13. In the embodiment shown this resistance consists of a line of graphite 19 shown on an exaggerated scale in Fig. 3 and drawn in the bottom of a longitudinal groove 12 in the external periphery of casing 27. In order to increase the resistance, if necessary, intermediate pieces 20 of plastic material or the like may be inserted in said line 19 of graphite.

For charging the charging device of the dosimeter instrument said instrument is shaken so as to cause the drop of mercury 11 to roll to and fro on the glass wall whereby an electric charge is built up in said wall 8 and on the foil 10. The drop of mercury transmits its charge to the outer casing 28 through the upper iron plate 9 and as a result hereof the metal foil 10 obtains a still higher potential by electrostatic influence. On depressing the cap 15 in the manner described the charge is allowed to leak from the foil 10 to the strip 18, through the large resistor 19, 20 in the groove 12, and contact spring 13 to the wire 2 of the electrometric system. As a result of the charge thus transmitted to the electrometric system the quartz wire 2a will deviate more or less depending on the ionisation of the air or gas enclosed within the chamber 1. Since the magnitude of ionisation depends on the presence of gamma or X-ray radiation, if any, in the air surrounding the instrument it is possible to read off said radiation by viewing through the instrument from the ocular end 5 and observing the reading indicated by the position of image of the more or less deviated wire 2a on the scale 6b.

The instrument is very convenient in use. For charging the instrument, all that is necessary is to shake the dosimeter to obtain a sufficient potential, and when it is desired to read off the existing radiation the cap 15 is depressed and as a result thereof the electrometric system is charged slowly in the manner described. In this manner it is possible to interrupt the charging of the electrometric system when a predetermined reading has been obtained.

The invention is naturally not limited to the form of construction now described, but the charging device may be made in several ways within the scope of the idea on which the invention is based. Thus the charging device can consist of one or several tubes, or tubular containers, conveniently placed so that the passage of light is not restricted, and with a mobile body in each of the tubes. The metal foils extending about each such container are connected in series with one another so as to give the largest possible potential. The drops of mercury introduced into the insulating container or containers can be substituted by some other liquid metal alloy (amalgam). The mobile bodies can also consist of solid bodies of different metals or insulating materials, for example glass tubes.

What we claim is:

1. In an electrometric system the combination with an electrometric element of said system responsive to electrical charges, of a charging device which comprises a wall of electrically insulating material, a mobile body disposed adjacent one face of said wall, means confining said mobile body for movement thereof along said wall in engagement therewith so as to generate electrical charges on said wall, a layer of conductive material disposed in inductive relation to said wall adjacent the face of said wall opposite to said face thereof engaged by said mobile body, and means for electrically connecting said conductive layer to said element of said electrometric system to charge said element with electrical charges developed upon said conductive layer.

2. In an electrometric system the combination with an electrometric element of said system responsive to electrical charges, of a charging device which comprises an inner tube of insulating material, an outer tube of insulating material concentric with said inner tube, a layer of conductive material disposed adjacent and extending about the outer surface of said outer tube in inductive relation to said outer tube, a conductive casing extending about said concentric tubes and concentric therewith in outwardly spaced insulated relation to said conductive layer, a conductive mobile body disposed in the annular space between said two concentric insulating tubes and movable in said annular space along and in engagement with the inner face of said outer tube so as to generate electrical charges on the wall of said outer tube and on said mobile body, a conductive member electrically connected to said outer casing and disposed at a given point in the path of movement of said mobile body for engagement by and electrical connection to said mobile body at said given point for transferring charges between said mobile member and said casing, said electrometric element being supported in generally axial alignment with said concentric insulating tubes in insulated relation to said outer casing, and means operable to establish electrical connection of said conductive layer extending about said outer insulating tube to said electrometric element to charge said electrometric element with electrical charges developed in said conductive layer.

3. In an electrometric system the combination as defined in claim 2 which comprises optical means supported by said casing in axial alignment with said concentric tubes and said electrometric element for observing the movements of said electrometric element effected upon establishing said electrical connection of said conductive layer to said element.

4. In an electrometric system the combination as defined in claim 1 in which said means for electrically connecting said conductive layer to said element comprises a resistor connected in circuit with said conductive layer and said element of said electrometric system.

5. In an electrometric system the combination as defined in claim 1 which comprises switch means in said connection between said conductive layer and said electrometric element operable to establish and disestablish said connection.

6. In a radiation dosimeter for indicating gamma and X-ray radiation the combination with an electrometric system having an element responsive to electrical charges and to modification of said charges by gamma and X-ray radiation, of a charging device comprising a container having an enclosing wall of electrically insulating material, a mobile body enclosed in said container, means for confining said mobile body for movement thereof along said wall in engagement therewith so as to generate electrical charges on said wall of said container, a layer of conductive material applied upon the outside surface of said wall of said container for developing electrical charges on said layer, and means for connecting said element of said electrometric system conductively to said conductive layer for transferring to said element electrical charges generated by said mobile body and developed on said conductive layer.

7. A charging device for an electrometric system responsive to electrical charges which comprises a wall of electrically insulating material, a mobile body disposed adjacent one face of said wall, means confining said mobile body for movement thereof along said wall in engagement therewith so as to generate electrical charges on said wall, a layer of conductive material disposed in inductive relation to said wall adjacent the face of said wall opposite to said face thereof engaged by said mobile body for developing electrical charges on said layer, and means connected to said conductive layer and connectible to said electrometric system for transferring electrical charges from said layer to said system.

8. A charging device as defined in claim 7 which comprises an inductive member disposed in spaced face to face inductive relation to said conductive layer for inducing electrical charges on said layer.

9. A charging device as defined in claim 8 in which said inductive member is of conductive material, and means connected to said inductive member and engageable by said mobile body in said movement thereof for transferring to said inductive member charges carried by said mobile body.

10. A charging device for an electrometric system responsive to electrical charges which comprises an inner tube of insulating material, an outer tube of insulating material concentric with said inner tube, a layer of conductive material disposed adjacent and extending about the outer surface of said outer tube in inductive relation to said outer tube, a conductive casing extending about said concentric tubes and concentric therewith in outwardly spaced insulated relation to said conductive layer, a conductive mobile body disposed in the annular space between said two concentric insulating tubes and movable in said annular space along and in engagement with the inner face of said outer tube so as to generate electrical charges on the wall of said outer tube and on said mobile body, a conductive member disposed at adjacent ends of said two concentric insulating tubes and electrically connected to said outer casing and so as to be engaged by said mobile body in said movement thereof along said inner face of said outer tube to transfer charges from said mobile body to said outer casing, and means connected to said conductive layer extending about said outer insulating tube and connectible to said electrometric system to transfer to said system electrical charges developed upon said conductive layer.

11. A charging device as defined in claim 7 in which said mobile body is mercury.

12. A charging device as defined in claim 7 in which said mobile body is an alloy of mercury.

13. A charging device as defined in claim 7 in which said mobile body is a solid.

14. A charging device as defined in claim 7 in which said mobile body is a metal.

15. A charging device as defined in claim 7 in which said mobile body is of glass.

16. A charging device as defined in claim 7 in which said conductive layer is of metal.

References Cited in the file of this patent

UNITED STATES PATENTS 2,646,516　　Futterknecht　------------　July 21, 1953